Nov. 23, 1937. B. AMES 2,099,788

COOKING APPARATUS

Filed July 10, 1935 2 Sheets-Sheet 1

Inventor
Butler Ames
by Roberts, Cushman & Woodberry
Attys.

Patented Nov. 23, 1937

2,099,788

UNITED STATES PATENT OFFICE 2,099,788

COOKING APPARATUS

Butler Ames, Boston, Mass.

Application July 10, 1935, Serial No. 30,667

5 Claims. (Cl. 53—5)

This invention relates to the art of cooking and its principal object is to provide an improved method of and apparatus for cooking food, whereby all vapors and odors emanating therefrom are consumed or reduced to odorless gases before escaping into the atmosphere, or carried away so that they will not become the source of annoyance.

Other objects are to provide an apparatus which is so designed that the proper cooking temperature and other conditions may be maintained throughout the cooking operation; to provide an odorless cooker which may be used with either a range or stove burning a solid or a liquid fuel, a gas stove, or an electric heater, and which is so designed that all vapors and odors emanating from the food being cooked are conducted into the vicinity of the source of heat where they are consumed, reduced or carried away; to provide a cooking apparatus wherein superheated vapors may be employed, when desired, in cooking the food; to provide a cooking apparatus having an enclosed chamber wherein meats, fish and the like foods may be fried, baked or broiled, and wherein excess grease or fats expelled therefrom are collected in a separate compartment and all vapors conducted from the chamber to an enclosed space in close proximity to the source of heat where they are effectively destroyed or carried away; to provide a cooking apparatus which is efficient, economical and reliable, which can be easily cleaned, and which is adapted for various culinary uses; and to provide a cooking apparatus which is of simple design and of a strong and durable construction, having but few parts, which is inexpensive to manufacture and assemble, and which may be sold at a relatively low cost.

Further objects relate to the operation of my improved apparatus and to various features of construction and will be apparent from the following description and accompanying drawings, wherein:

Figs. 3 and 4 are sectional elevations showing modified forms of cooking apparatus; and Figs. 5 and 6 are sectional elevations of further modifications.

Figure 1:
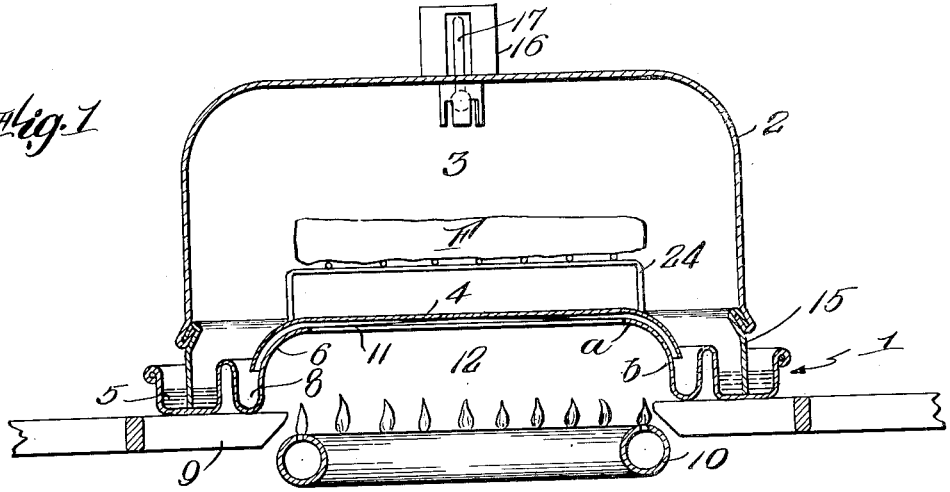
Fig. 1 is a sectional elevation of one form of cooking apparatus constructed in accordance with the present invention.
Figure 2:
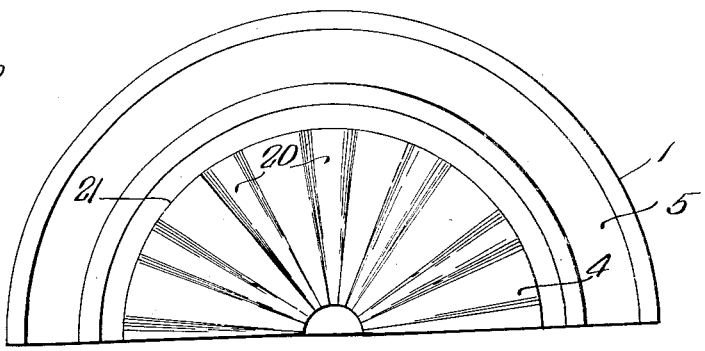
Fig. 2 is a fragmentary top plan view of the apparatus shown in Fig. 1 with the cover removed.
Figure 3:
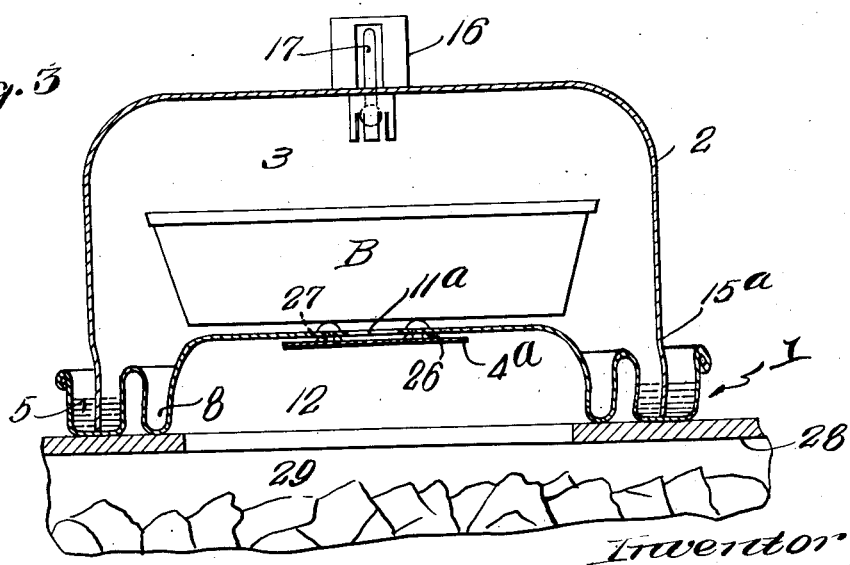

The embodiment shown in Figs. 1 and 2 comprises an annular base member 1, a closure 2 which is supported on the base member and defines therewith a cooking chamber 3 for broiling, baking, roasting, boiling, or any other cooking purpose, and a deflector plate 4 which may provide a supporting element for the food to be roasted or cooked. The base member 1 is preferably made of sheet metal, such for example as stainless steel, Monel metal, or the like resistant metal, although it is to be understood that other materials may be employed. The base may be of any desired size and shape, depending upon the particular purpose or use for the which the utensil is designed; for example, a utensil adapted for baking a large loaf of bread, an average size roast, a fowl, etc. may be oval or substantially rectangular in shape, having a length or major dimension of the order of 12 to 18 inches, a width or minor dimension of the order of 9 to 15 inches, and a height of from 6 to 12 inches.

As here shown by way of illustration, the base is annular in shape and its outer periphery is depressed or otherwise shaped to provide an annular trough 5. The inner periphery of the base member is shaped to provide an upwardly inclined wall 6, and between the wall 6 and the trough 5 the base member is provided with a second annular depression 8 which constitutes a grease-collecting trough when the apparatus is used for broiling. The trough 8 further serves as a conductor leading to the exit of the chamber 3, through which smoke and gases are discharged. The bottom of the trough 5 provides a base or stand adapted to be supported on the top of a stove, range or the like source of heat, and, as here shown, is supported on the fins 9 of a gas stove having an open flame burner 10. The central opening 11 in the base member is of such size and shape as will give the necessary length of passage from point $a$ to point $b$, to permit sufficient heating of the outflowing smoke and vapors to cause their reduction before escaping from the reduction chamber 12.

The closure or cover 2 comprises a dome shaped structure having a rim 15 which conforms in size and shape to the outer depression or annular trough 5 so that it may be received therein as shown in Fig. 1. The cover 2 may be of sheet metal, such as aluminum or other non-rusting material, and is provided with a handle 16 and, if desired, a thermometer 17 may be built in or otherwise secured thereto. Where, as here shown, the body of the cover is of aluminum or the like material, its rim 15 may be of a material having a higher specific heat, such for example as stainless steel. The lower edge of the rim and the bottom of the trough are preferably made perfectchamber 3. The parts are so designed that the body of the plate 4ᵃ is substantially flush with the lower surface of the trough 32, and its periphery is spaced from the inclined wall 34 thereby defining an annular combustion chamber 12ᵃ in which all gases and vapors from the chamber 3 are discharged. As the chamber 12ᵃ is closely adjacent to the heating element 38 of the electric heater 39, all gases and vapors discharged into the chamber 12ᵃ are completely consumed or reduced before passing downwardly through the openings in the bottom of the heater.

The embodiment shown in Fig. 5 is similar to that shown in Figs. 1 and 2, but is provided with a shield member which consists of an annular rim member 40 and an upstanding inner flange 41 integral with the rim. The flange 41 has a pressed fit within the wall of the inner trough 8 and the parts are so designed that the rim 40 is held in spaced relation to the bottom of the troughs 5 and 8, thus providing a heat insulating chamber between the troughs 5 and 8 and the top of the stove 49 which supports the apparatus and prevents the hot gases discharged from the chamber 12 and the source of heat from coming in contact with the water trough.

The embodiment shown in Fig. 6 comprises a circular base member 1ᵇ having a single peripheral trough 55 in which the rim of the closure 2 is received. The center of the base member is provided with a depending duct 56 which terminates in a laterally extending peripheral flange 57 and a deflector plate 58 is riveted or otherwise secured in spaced relation to the flange 57, thus providing a passage leading from the cooking chamber 3 to the reduction chamber 12. Between the duct 56 and trough 55, the base is provided with a plurality of spaced bosses 59 which serve as spacers for holding the bottom of a pan or the like container in spaced relation to the upper surface of the base.

While I have shown and described different desirable embodiments of the invention, it should be understood that this disclosure is for the purpose of illustration only, and that various changes in shape, proportion and arrangement of parts, as well as the substitution of equivalent elements for those herein shown and described, may be made without departing from the spirit and scope of the invention as set forth in the appended claims.

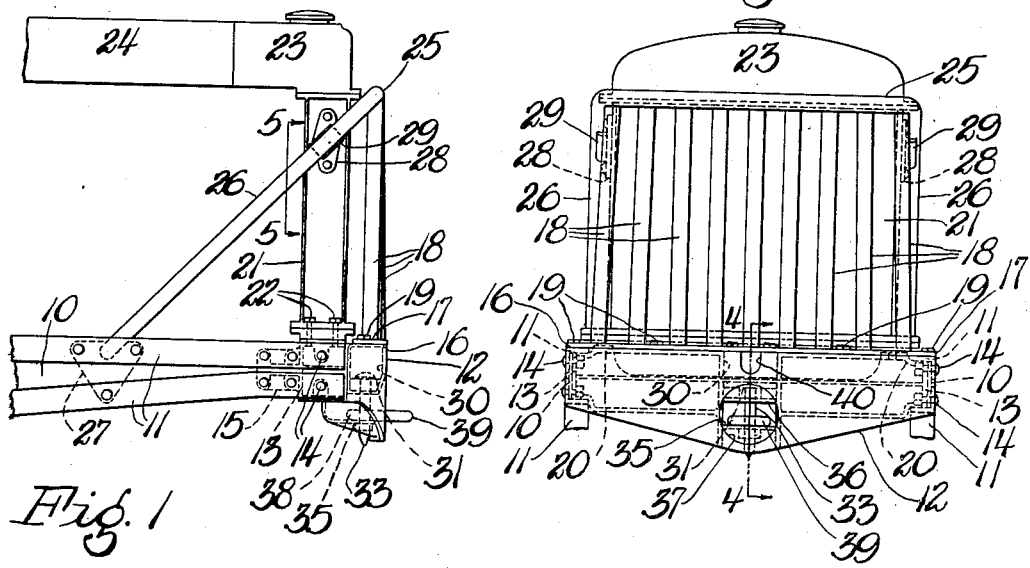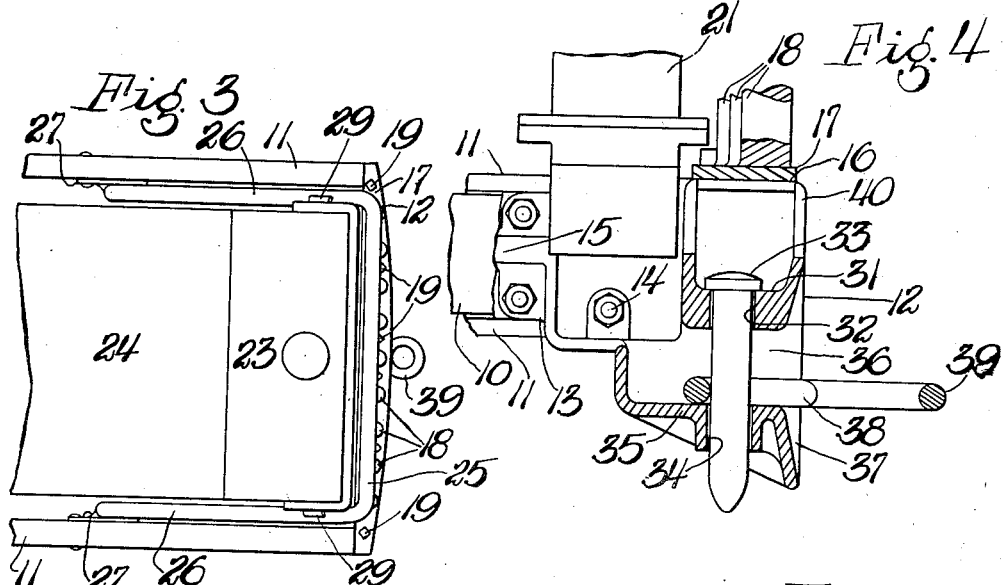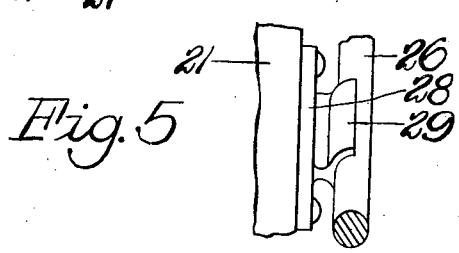

I claim:

1. Cooking apparatus comprising a base member having a central opening and a continuous peripheral trough for holding a liquid, said trough being adapted to surround a source of heat, a dome-like closure having its rim disposed in said trough and defining an enclosure for the reception of the food to be cooked, means supported by said base member at points intermediate said opening and trough for supporting said food at a level above said opening, and a deflector plate disposed on one side of said opening and in spaced relation to the marginal portions surrounding said opening, thereby to provide a vent for said chamber leading to the vicinity of said source of heat.

2. Cooking apparatus comprising a base member having a central opening and a continuous peripheral trough for holding a liquid, said trough being adapted to surround a source of heat, a dome-like closure having its rim disposed in said trough and defining an enclosure for the reception of the food to be cooked, a deflector plate disposed below said opening and in spaced relation to the marginal portion surrounding said opening, and means for supporting said food at a level above said marginal portion, said supporting means and deflector plate being arranged to define a vent passage for said chamber leading to the vicinity of said source of heat.

3. Cooking apparatus comprising a base member having inner and outer peripheral troughs and a central opening, the inner periphery of said base member intermediate said opening and inner trough extending inwardly from the upper edge of said inner trough, a dome-like closure having its rim disposed in said outer trough and defining an enclosure for the reception of food to be cooked, and a deflector plate supported in spaced relation to said inner periphery and defining a vent passage for said chamber leading outwardly through the bottom of said apparatus.

4. Cooking apparatus comprising a base member having inner and outer peripheral troughs and a central opening, the inner periphery of said base member intermediate said opening and inner trough extending inwardly from the upper edge of said inner trough, a dome-like closure having its rim disposed in said outer trough and defining an enclosure for the reception of the food to be cooked, a deflector plate disposed on one side of said opening, and means for supporting said food at a level above said opening, said supporting means and deflector plate being arranged to define a vent passage for said chamber leading outwardly through the bottom of said apparatus.

5. Cooking apparatus comprising a base member having inner and outer peripheral troughs and a central opening, the inner periphery of said base member intermediate said opening and inner trough extending inwardly from the upper edge of said inner trough, a dome-like closure having its rim disposed in said outer trough and defining an enclosure for the reception of food to be cooked, a deflector plate having parts supported in spaced relation to said inner periphery and defining a vent passage for said chamber leading outwardly through the bottom of said apparatus, and a shield member having an inner upstanding flange fitting against the inner wall of said inner trough and a rim portion extending outwardly in spaced relation to the bottom of said troughs.

BUTLER AMES.